(12) United States Patent
Axelrod et al.

(10) Patent No.: US 7,810,455 B2
(45) Date of Patent: Oct. 12, 2010

(54) PET CHEW INCLUDING COMPRESSIBLE CENTRAL PORTION

(75) Inventors: Glen S. Axelrod, Colts Neck, NJ (US); Ajay Gajria, Monmouth Junction, NJ (US); Zhenghong Tao, Spring Lake, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 133 days.

(21) Appl. No.: 11/870,037

(22) Filed: Oct. 10, 2007

(65) Prior Publication Data

US 2009/0095231 A1    Apr. 16, 2009

(51) Int. Cl.
*A01K 29/00* (2006.01)

(52) U.S. Cl. .................................................... 119/709

(58) Field of Classification Search ......... 119/707–711; 446/183, 184, 197, 486; 601/118
See application file for complete search history.

(56) References Cited

U.S. PATENT DOCUMENTS

| | | | | |
|---|---|---|---|---|
| 2,003,958 | A | * | 6/1935 | Salisbury .................... 119/709 |
| 4,133,296 | A | | 1/1979 | Smith |
| 4,378,007 | A | * | 3/1983 | Kachadourian ............. 601/121 |
| 4,627,618 | A | * | 12/1986 | Schwartz .................... 482/108 |
| 4,802,444 | A | | 2/1989 | Markham et al. |
| D307,339 | S | | 4/1990 | Markham |
| D308,122 | S | | 5/1990 | Markham |
| 5,174,243 | A | * | 12/1992 | O'Rourke ................... 119/709 |
| RE34,352 | E | | 8/1993 | Markham |
| D343,262 | S | | 1/1994 | Axelrod |
| D344,161 | S | | 2/1994 | Markham |
| D349,786 | S | | 8/1994 | Markham |
| 5,529,016 | A | | 6/1996 | Lonsway |
| D373,859 | S | | 9/1996 | Markham |
| 5,640,931 | A | | 6/1997 | Markham |
| 5,830,161 | A | * | 11/1998 | Cosmano ..................... 601/121 |

(Continued)

FOREIGN PATENT DOCUMENTS

HK    0602912.2    7/2006

OTHER PUBLICATIONS

International Search Report and Written Opinion dated Dec. 24, 2008 issued in related International Patent Application No. PCT/US08/79386.

*Primary Examiner*—Rob Swiatek
*Assistant Examiner*—Ebony Evans
(74) *Attorney, Agent, or Firm*—Grossman, Tucker, Perreault & Pfleger, PLLC

(57) ABSTRACT

The present disclosure provides an animal chew comprising an elongated central portion of a first material and a pair of end caps of a second material. The end caps may be connected by a shaft and may vary from the central portion or from each other by one or more properties such as, color, texture, hardness, toughness, functionality, flavor, odor or moisture level. The central portion of the dog chew may comprise a bladder, or a composite of materials such as one or more layers overlying the bladder, having an attractive design in the shape and/or texture of, e.g. a sports ball. The composite may comprise a soft or even fibrous cover overlying an elastomeric bladder, the bladder formed to fit relatively loosely over the shaft, the composite providing a soft and easily compressed central portion compared to the end caps.

17 Claims, 5 Drawing Sheets

U.S. PATENT DOCUMENTS

| | | |
|---|---|---|
| 5,832,877 A | 11/1998 | Markham |
| 5,865,146 A | 2/1999 | Markham |
| 5,904,118 A | 5/1999 | Markham |
| 5,947,061 A | 9/1999 | Markham et al. |
| 6,092,489 A | 7/2000 | Huettner et al. |
| 6,112,703 A * | 9/2000 | Handelsman ............... 119/707 |
| 6,129,053 A | 10/2000 | Markham et al. |
| 6,148,771 A | 11/2000 | Costello |
| D435,713 S | 1/2001 | Speck |
| D435,955 S | 1/2001 | Speck |
| 6,186,096 B1 * | 2/2001 | Miller ........................ 119/709 |
| 6,216,640 B1 * | 4/2001 | Zelinger ..................... 119/707 |
| D453,242 S | 1/2002 | Kaplan |
| 6,354,050 B1 | 3/2002 | Pankoski |
| 6,379,725 B1 | 4/2002 | Wang et al. |
| D461,025 S | 7/2002 | Pentland |
| 6,415,740 B1 * | 7/2002 | Curry ......................... 119/707 |
| 6,427,634 B1 | 8/2002 | Mann |
| 6,439,166 B1 | 8/2002 | Markham |
| 6,470,830 B2 | 10/2002 | Mann |
| 6,499,485 B1 * | 12/2002 | Pepera ........................ 128/845 |
| 6,513,457 B2 | 2/2003 | Huddleston |
| 6,546,896 B1 | 4/2003 | Markham |
| 6,575,119 B1 | 6/2003 | Lonsway |
| 6,584,938 B2 * | 7/2003 | Sherrill et al. .............. 119/710 |
| D485,046 S | 1/2004 | Hague |
| 6,676,481 B2 * | 1/2004 | Klaus et al. ................. 446/489 |
| D489,161 S | 5/2004 | Hague |
| D490,965 S | 6/2004 | Lawrenson |
| D493,260 S | 7/2004 | Oblack |
| 6,793,636 B1 * | 9/2004 | Pepera ........................ 601/15 |
| D498,571 S | 11/2004 | Lawrenson et al. |
| 6,981,471 B1 | 1/2006 | Dubinins |
| D514,278 S | 2/2006 | Weinberg |
| D515,253 S | 2/2006 | Viola |
| 7,017,523 B2 * | 3/2006 | Handelsman ............... 119/707 |
| D525,397 S | 7/2006 | Wang |
| 7,100,539 B2 | 9/2006 | Levan |
| 7,112,178 B1 * | 9/2006 | Roozenburg ................. 601/15 |
| 7,144,293 B2 * | 12/2006 | Mann et al. ................. 446/184 |
| 7,223,251 B1 * | 5/2007 | Cassidy Phillips .......... 601/118 |
| 7,278,374 B2 | 10/2007 | Mann |
| D573,262 S * | 7/2008 | Soucy ........................ D24/211 |
| 7,410,662 B1 * | 8/2008 | Tsengas ........................ 426/2 |
| 2001/0042521 A1 * | 11/2001 | Suchowski et al. .......... 119/709 |
| 2002/0102912 A1 * | 8/2002 | Duval ......................... 446/486 |
| 2004/0134446 A1 | 7/2004 | Keller |
| 2004/0211369 A1 | 10/2004 | Wechsler |
| 2004/0216693 A1 * | 11/2004 | Handelsman ............... 119/709 |
| 2004/0244719 A1 * | 12/2004 | Jager ......................... 119/709 |
| 2005/0045115 A1 | 3/2005 | Mann |
| 2006/0048718 A1 | 3/2006 | Mann |
| 2006/0048719 A1 * | 3/2006 | Myers ........................ 119/710 |
| 2006/0225666 A1 * | 10/2006 | Axelrod ..................... 119/709 |
| 2007/0227464 A1 * | 10/2007 | Axelrod et al. ............. 119/709 |
| 2009/0071412 A1 * | 3/2009 | Ritchey ..................... 119/709 |
| 2009/0078214 A1 * | 3/2009 | Mann ........................ 119/709 |

* cited by examiner

PET CHEW INCLUDING COMPRESSIBLE CENTRAL PORTION

FIELD

This invention relates to molded pet toys and, more particularly, to molded dog chews which may comprise a relatively softer elongated and compressible central portion and a pair of relatively harder more durable end caps. In addition, the invention relates to the use of a "dog bone" configuration that may be assembled from component parts by a variety of methods.

BACKGROUND

Most dogs enjoy chewing on things, although preferences may vary as to the hardness of the substances favored. Some dogs like to chew on very hard materials such as cow bones, wood and nylon, while others prefer softer chews such as polyurethane or rubber. Some dogs, due to their age, may not be able to chew on very hard substances. Young dogs may have insufficiently developed teeth, while old dogs may have diseased gums or may have lost some of their teeth.

Edible dog chews have been marketed which have a comparatively short shelf life and therefore must be replaced by retail outlets at frequent intervals. Yet other prior art dog chews may be lacking in structural integrity whereby they are susceptible to breakage during handling and shipping.

Pet toys such as dog chews may be produced in the form of strips or toys or even bone shapes, generally having larger ends and a smaller elongated shaft to allow the dog to easily pick them up. The ends are generally bulbous and may be in the shape of a condyle. Dogs generally will hold a dog chew between their paws in order to chew the ends and an elongated shape allows easy access to the ends to maintain interest.

SUMMARY

In a first exemplary embodiment, the present disclosure is directed an animal chew comprising an elongated central portion of a first material and a pair of end caps and a shaft of a second material, wherein said central portion comprises an elastomeric bladder which overlies but is spaced from said shaft, wherein said shaft connects said endcaps. The bladder may include a longitudinal axis and an inner surface and the shaft may include a longitudinal axis and an outer surface and the inner surface of the bladder along the longitudinal axis is concave relative to the outer surface of the shaft.

In a second exemplary embodiment, the present disclosure relates to a method of producing an animal chew comprising providing an elongated central portion including a bladder, the elongated central portion having two ends and providing a pair of end caps, each of the end caps having a recessed portion for receiving either of the ends of said central portion. This may be followed by providing a shaft to connect the end caps and attaching one of the pair of end caps to the shaft and placing the central portion over the shaft. One may then attach the other of the pair of end caps to the shaft wherein the ends of the central portion each engage a recessed portion of the end caps. The bladder may include a longitudinal axis and an inner surface and the shaft may include a longitudinal axis and an outer surface and the inner surface The elastomeric bladder may include an outer layer of one or more materials having an attractive design in the shape and/or texture of a sports ball. The bladder may be formed to fit loosely over and spaced from at least a portion of the shaft such that the central portion of the animal chew may be easily compressed. This may be due to the bladder having a more concave-shaped inner surface along its longitudinal axis than the shaft is convex along its longitudinal axis. In addition, the outer layer may include one or more soft cover layers overlying the outer surface of the bladder. The outer layer may comprise a fibrous material In a related embodiment, the techniques for attaching the end caps to the central shaft may include insert molding, adhesive or chemical bonding, melt bonding, mechanical attachment or a combination of such methods. In one exemplary embodiment, the end caps may be attached to the shaft by providing a molded external thread on one or both ends of the shaft and a complementary internal thread one or both of the end caps.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Figure 1:
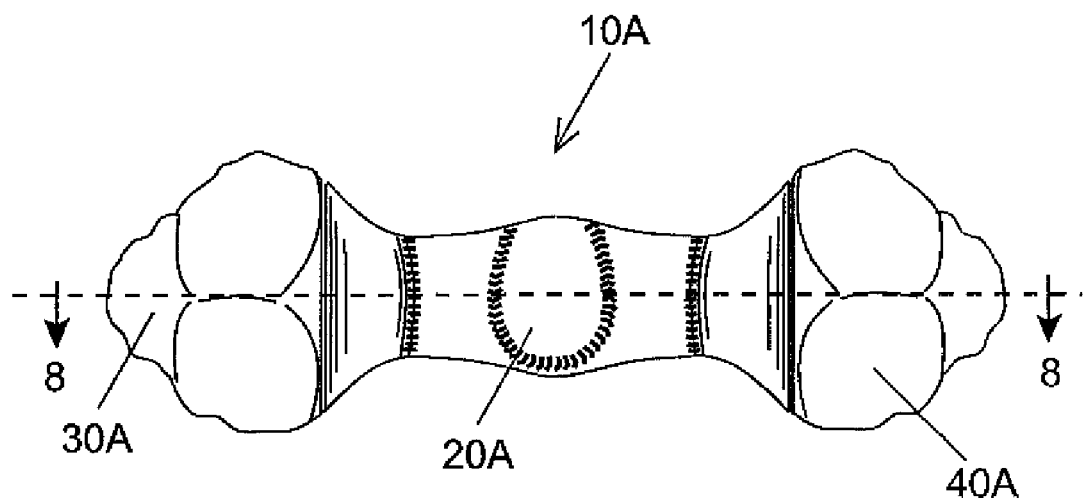
FIG. 1 is a perspective view of a first exemplary embodiment of an animal chew according to the present invention.

For elements common to the various embodiments of the invention, the numerical reference character between the embodiments is held constant, but distinguished by the addition of an alphanumeric character to the existing numerical reference character. In other words, for example, an element referenced as 10A in the first embodiment is correspondingly referenced as 10B, 10C, and so for the in subsequent embodiments. Thus, where an embodiment description uses a reference character to refer to an element, the reference character applies equally as distinguished by alphanumeric character, to the other embodiments where the element is common.

In accordance with the present invention, methods of manufacturing an animal chew are disclosed. In addition, dog chews are disclosed which may comprise an elongated central portion of a first material and a pair of end caps of a second material. The end caps may vary from the central portion or from each other by one or more properties such as, color, texture, hardness, toughness, nutritional value, flavor, odor or moisture level. The end caps may be connected by a central shaft and the central portion may comprise a composite of an outer layer, which overlies a bladder, the bladder overlying but which may be spaced from the shaft.

FIG. 1 illustrates, in perspective view, a first exemplary embodiment of an animal chew 10A comprised of an elongated central portion 20A and end caps 30A and 40A. The central portion 20A may generally be of elongated shape and may be hollow and overlie a shaft (not shown) which may connect the end caps 30A, 40A. As illustrated in FIGS. 2-6, the central portion may have a variety of appealing shapes and/or designs. Generally, the central portion 20A may comprise a relatively softer material (e.g. lower relative Shore Hardness) and be more compressible (e.g. lower relative flex modulus or $E_{flex}$) than the end caps 30A, 40A and the end caps may comprise a more durable material as they may be the subject of more intense chewing by the dog. For example, the central portion may have a Shore Hardness of less than or equal to 100 A, whereas the end caps may have a Shore Hardness of greater than or equal to 50 D. It is further contemplated that the bladder may be a material of reduced specific gravity, for instance below 1.0, and be formed of a foamed material, such as but not limited to, a microcellular foam.

The central portion 20A may be used for picking up and carrying the chew by the animal. By being generally softer and more compressible than the end caps, the central portion may also provide an alternative chewing experience. The end caps 30A, 40A may be of a wide variety of molded shapes and designs, even differing from one end to the other. Generally, the end caps may comprise a durable plastic material such as polyamide or nylon (e.g. nylon-6,6 or nylon 6) or polyurethane to prolong the life of the dog chew. The resin used for the end caps may therefore include, but not be limited to a variety of engineering thermoplastics have a flex modulus of greater than or equal to about 150,000 psi, such as nylon-6,6, polyesters, etc. The end caps may also comprise a shape or design that provides oral health benefits, including projections, grooves, etc. which may serve to massage the gums and clean the teeth of the pets during the chewing action.

The dog chew herein may comprise two or more materials, as between the central portion and end caps, which may differ in some physical, optical, sensual, functional or compositional property. A difference in physical property may be understood to include, but not be limited to, a difference in hardness, tensile strength, modulus, elongation or compressive strength. A difference in optical property may be understood herein as a difference in, e.g., color, indicia or clarity. A difference in sensual properties may be understood as a difference in attractant level, wherein an attractant may be understood as any additive that may stimulate an animal's sense of smell to be attracted to the dog chew herein.

FIG. 1 is a perspective view of an exemplary embodiment of the present invention wherein an animal chew 10A comprises end caps 30A, 40A and at least a portion of the central shaft 20A includes at least some of the physical design features of a baseball, including stitches outlining a portion of the ball. The central portion may even further include decorations or logos for a favorite sports teams or sports organizations, trademarks, etc.

It may be understood herein that when the central portion includes at least some of the physical features of a baseball, or other sports ball, it is meant that the outer surface of the central portion may include one or more of the following characteristics of a ball used in a sport; stitches, lacing, texture, decorative pattern, color, dimpling, shape, markings and materials of construction. For instance, a soccer ball may have a hexagonal pattern and a tennis ball appearance may provide a felt outer cover and white seams in an interlocking double dumbbell pattern. Felt may be understood, in the case of a non-woven, as a sheet of matted fibers, bonded together by needle-punching and/or chemical processes and the application of moisture, heat and pressure. Felt may also be understood, in the case of a woven, as a material shrunk by a combination of moisture, heat, chemical and pressure so as to make it almost impossible to distinguish the weave. It is further contemplated that at least some of the physical features of other sports-related shapes may incorporated into the central portion of the present invention, including but not limited to, a golf ball, a softball, and/or a NASCAR, IRL or F-1 racing car.

Figure 8:
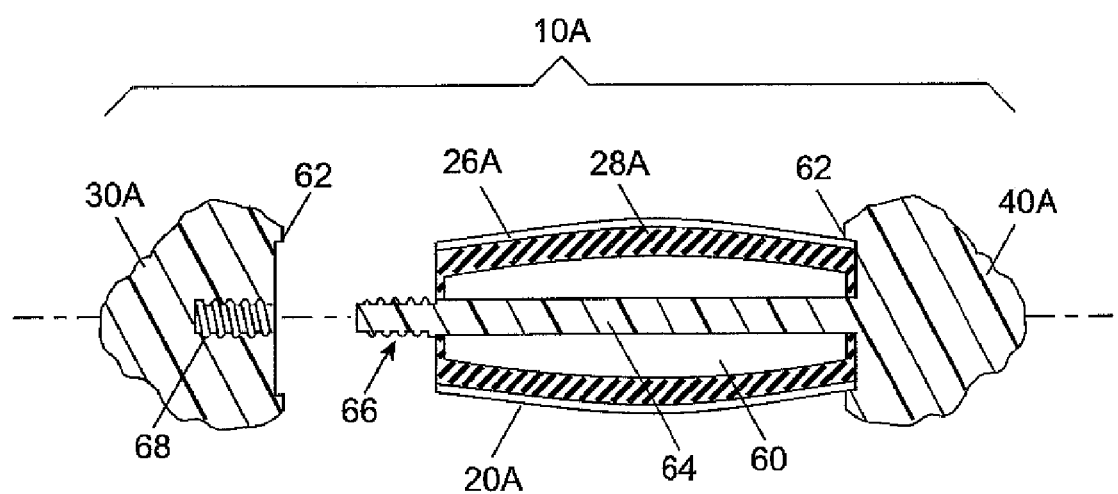
FIG. 8 is a cross-sectional view of FIG. 1 illustrating one means for attaching the end caps and a bladder comprising the central portion of the dog chew of the present invention.

FIG. 8 is a cross-sectional exploded view taken lengthwise through the animal chew of FIG. 1. This view illustrates one exemplary embodiment of the present invention to provide a relatively rigid, durable end cap 40A for chewing and a central portion 20A having a relatively softer, compressible composite construction. In this exemplary embodiment, the central portion 20A may comprise an elastomeric or rubber bladder 28A and an outer layer 26A of fibrous material. Reference to elastomeric may be understood as a material herein includes those materials that may have an elongation of greater than 50% when stretched with a recovery of 50-100%, including all values and increments therein. It may also include those polymer material that have a glass transition temperature or Tg below room temperature (25° C.) and which have more than 50% amorphous (non-crystalline) domains.

Figure 9:
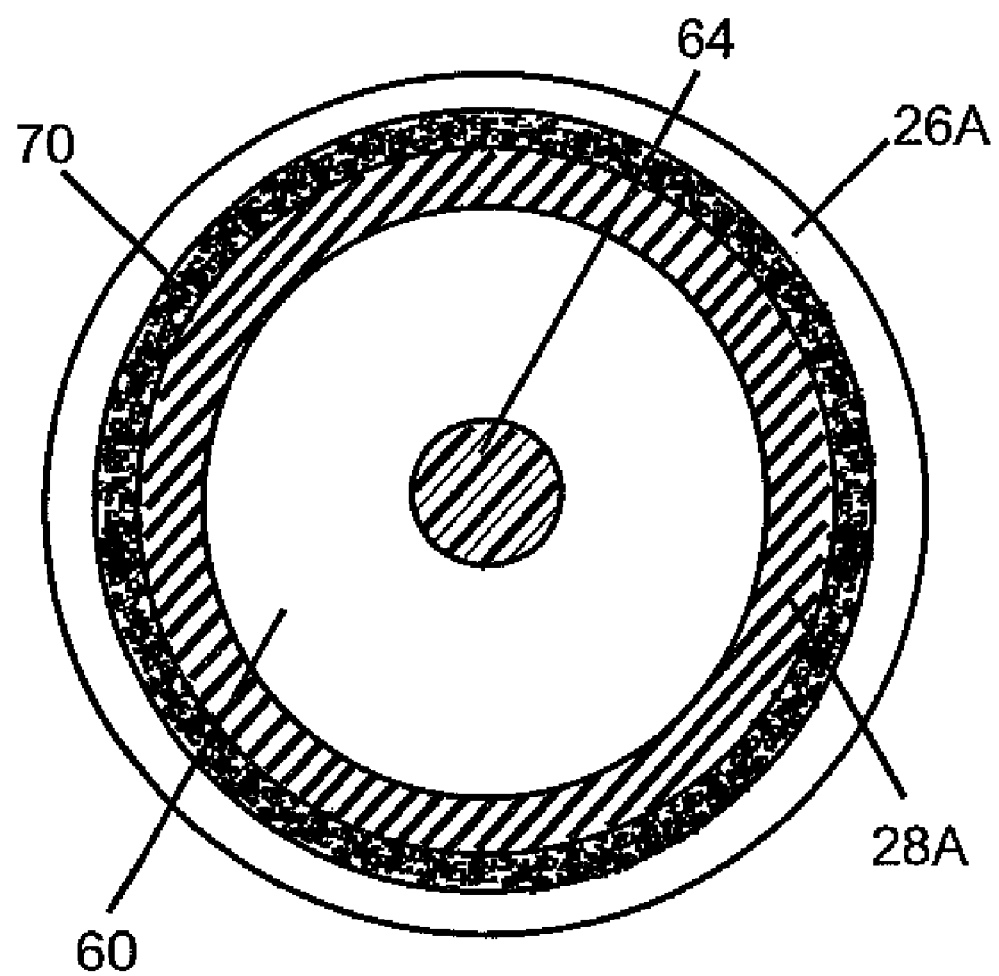
FIG. 9 is an enlarged cross-sectional view of the animal chew of FIG. 3 through the central portion.

The outer layer may, for instance, be leather in the case of a baseball, or felt in the case of a tennis ball, to provide authenticity to the feel and appearance of the central portion to resemble a specific type of sports ball. The outer layer may also comprise a plurality of layers and include, for instance, a backing layer 70 (see FIG. 9) to support the outer fibrous layer in the case where the fibrous layer may not be easily attached to the outer surface of the bladder. Fibrous materials are understood to mean materials that may be formed to have a relatively high length to width ratio, for instance, greater than 1000/1 and which may form a portion or all of a sheet material. These materials may include, but not be limited to, felt, suede, wovens, non-wovens, knits and leather. It is further contemplated that some combinations of bladder material and fibrous outer layer may not require the use of a backing layer.

As noted above, the bladder may be relatively soft and flexible as compared to the endcaps. In one related exemplary embodiment, the bladder may be shaped such that the bladder 28A has an inner surface that is concave in shape relative to its longitudinal axis. Such bladder may therefore be spaced from the shaft, and such spacing may be non-uniform along the length of the shaft. The shaft of the chew 64 may itself be concentric on its outer surface and the inner surface of said bladder along said longitudinal axis may be more concave than said shaft along its longitudinal axis. This may define a gap 60 between the shaft 64 and bladder 28A such that the central portion 20A of the dog chew 10A is compressible or squeezable and easily deflected. The gap may be in the range of 0.125-1.5 inches spaced from the shaft, including all values and increment therein. Where multiple layers may comprise the central portion 20A, these layers may be adhered to one another by, for instance, heating, adhesive, etc., to form a composite central portion. For example, the backing layer may amount to a thermoplastic adhesive which may bond the outer layer to the bladder.

Also shown in FIG. 8 is one exemplary embodiment of a means to attach the end caps and central portion of the dog chew 10A together. In this embodiment, the shaft 64 may be molded integrally with one end cap 40A and may include an end with an external thread 66. The other end cap 30A may include a matching internal thread 68 to allow engagement and disassembly, if desired to replace or exchange a component.

In addition, FIG. 8 illustrates a feature which may prevent the animal from easily separating the central, relatively softer portion from the relatively more rigid and durable end caps. A recess 62 may be formed in the outer surface of the end caps 30A, 40A outboard of the shaft 64 which may be complementary in shape to the end of the central portion 20A, in the illustrated case, a composite of an elastomeric bladder 28A and outer layer 26A. The recess may extend about the shaft circumferentially (360 degrees) which may then cover and protect the ends of the central portion from being exposed. When assembled together, the ends of the central portion 20A may then each lie within the recess 62 and not be readily accessible to the animal. Further, if the animal chew 10A is assembled by the threading of one or more end caps on the shaft, the threaded portion may be of such a length that the central portion may be compressed and forced into the recess by such threading action. This may also serve to increase the distance between the inner surface of the bladder 28A to the outer surface of the shaft 64 which may provide more relative compressibility of the central portion with respect to the shaft.

Figure 2:
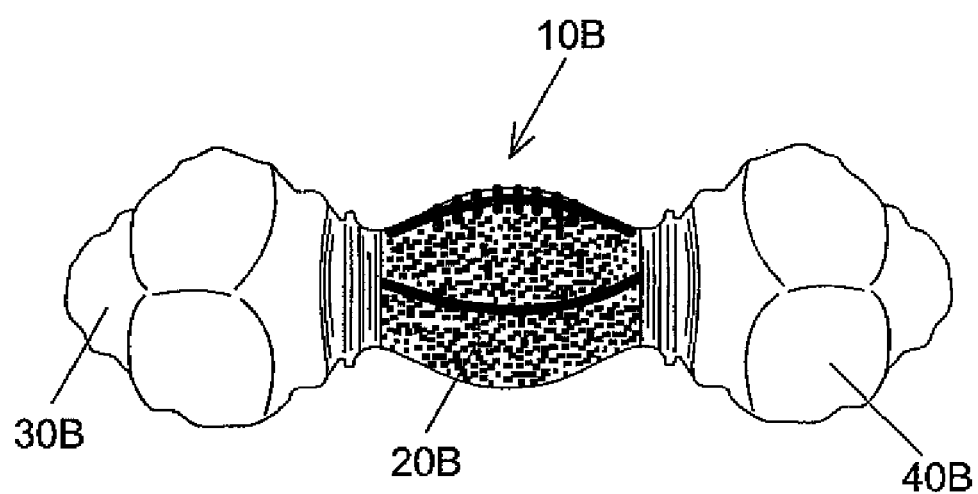
FIG. 2 is a perspective view of a second exemplary embodiment of another design for an animal chew, according to the present invention.
Figure 3:
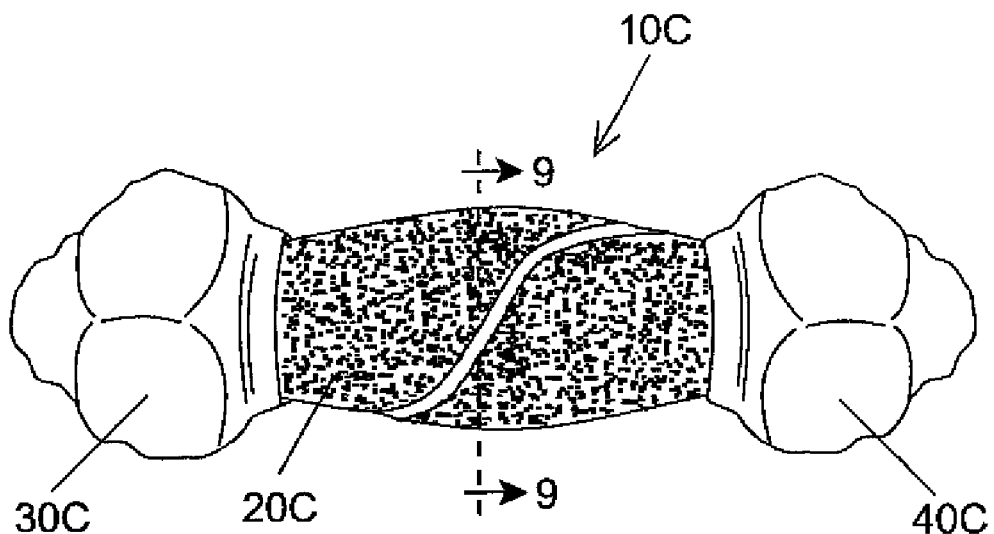
FIG. 3 is a perspective view of a third exemplary embodiment of another design for a dog chew, according to the present invention.
Figure 4:
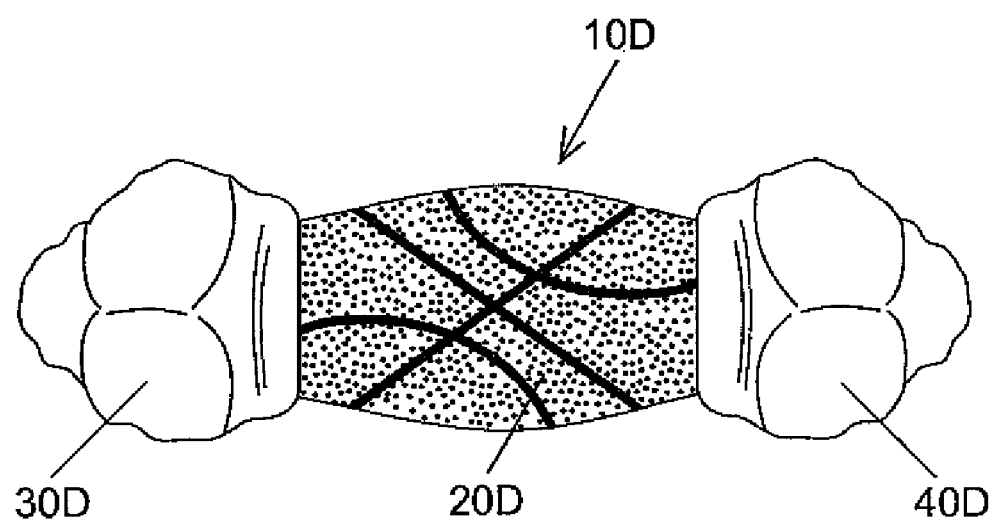
FIG. 4 is a perspective view of a fourth exemplary embodiment of another design for an animal chew, according to the present invention.

FIG. 2 is a perspective view of another exemplary embodiment of the present invention wherein an animal chew 10B comprises end caps 30B, 40B at least a portion of the central shaft 20B resembles a football, including the texture and the laces used to grip the ball. FIG. 3 is a perspective view of another exemplary embodiment of the present invention wherein an animal chew 10C comprises end caps 30C, 40C at least a portion of the central shaft 20C includes some of the features of a tennis ball, including an outer cover having a fibrous outer surface. The central portion 20C may comprise tennis ball material such as a felt outer layer and white striping in at least a portion of a double dumbbell pattern. FIG. 4 is a perspective view of an exemplary embodiment of the present invention wherein an animal chew 10D comprises end caps 30D, 40D at least a portion of the central shaft 20D includes some of the features of a basketball, including a pebbled outer gripping surface with grooves.

Figure 5:
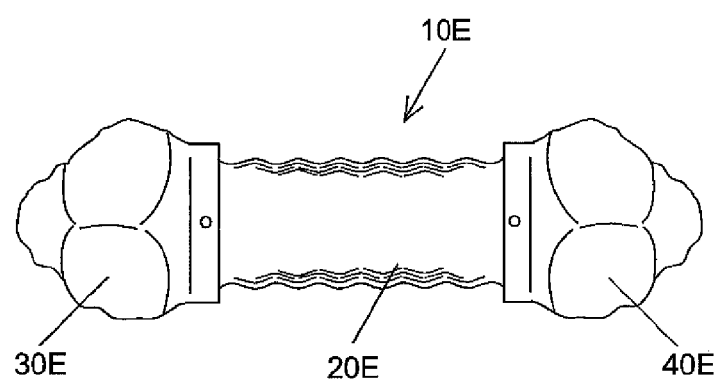
FIG. 5 is a perspective view of a fifth exemplary embodiment of another design for an animal chew, according to the present invention.
Figure 6:
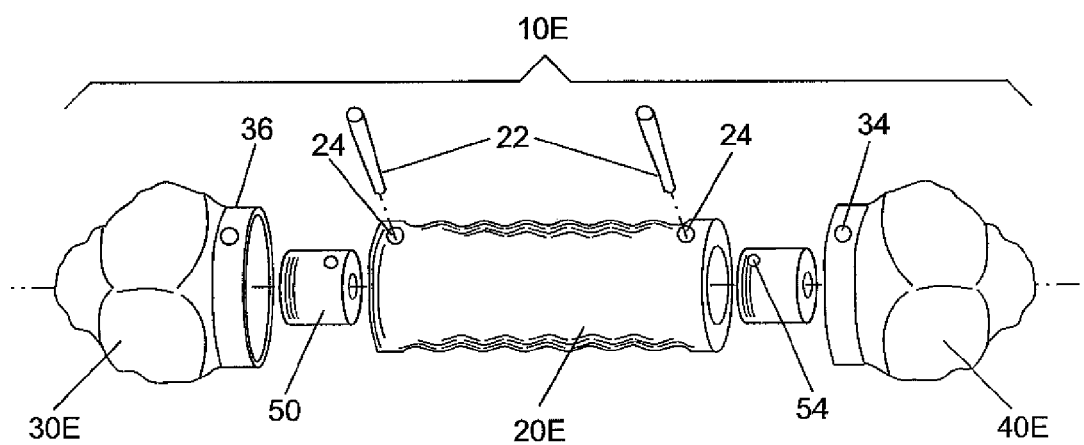
FIG. 6 is an exploded view of FIG. 5 illustrating one means for assembling the pet chew.

The central shaft and end caps of the present invention may be assembled or attached by a variety of methods. Preferably, the end caps and the end of the shaft include complementary features, such as shaped surfaces or projections/undercuts or recesses/protrusions that assist in the attachment of the ends to the shaft. For instance, the shaft and end caps may be fastened together mechanically, that is by, for instance, screws, bolts, washers, etc. or threading as shown in FIG. 8. FIG. 5 is a perspective view of an exemplary embodiment of the present invention wherein an animal chew 10E comprises end caps 30E, 40E at least a portion of the central portion 20E comprises a hollow elastomeric or rubber tube and the tube and end caps are attached by screws which project through both the ends of the shaft. FIG. 6 is an exploded view of FIG. 5 illustrating two screws 22 which may be inserted into holes 34 in the flanges 36 of the end caps and into holes 24 in the central portion 20E. Holes 24 and 34 may be threaded to receive the screws 22 or a pair of shafts 50 may be placed inside the central portion 20E, the shafts having threaded holes 54 for receiving the screws 22.

Figure 7:
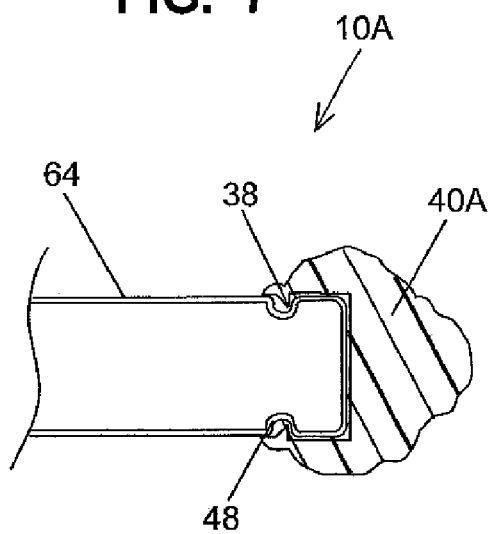
FIG. 7 is a cross-sectional view of FIG. 1 illustrating how assembly may be accomplished by other attachment methods.

FIG. 7 is a cross-sectional view of the shaft 64 and an end cap 40A of FIG. 1 which will be used to illustrate another method of attaching the end caps to the shaft. In one exemplary embodiment, the end cap 40A and shaft 64 may differ in resiliency or stiffness such that a friction or snap fit may be possible. In such an instance, the end cap and shaft are designed with tolerances that may allow a feature 38, such as a ridge or groove on, for instance, the inside of the end cap 40A to engage with or interfere with a complementary feature 48 on, for instance, the outside of the end of the shaft 64. Using sufficient force, the end cap and shaft may be forced together to be assembled, and the dielock condition created between the features 38, 48 may prevent easy disassembly. In addition, either of the features may be coated with an adhesive to ensure a more permanent bond between shaft and end cap.

The end cap 40A and shaft 64, or the central portion 20A, may also be assembled by molding one of the components against the other component (insert molding). For instance, the shaft 64 may be formed by one of the known melt processes for plastic materials, followed by placing the end of the shaft, or central portion, into an injection mold (or other plastics processing mold) and forming the end caps against the end of the shaft or central portion. In this fashion, the shaft or central portion and end cap may be melt bonded together. If incompatible materials are used for the shaft and end cap such that melt bonding does not take place, it is contemplated that a higher shrinkage resin may be used for the end cap such that upon cooling after molding, a shrink fit is obtained over the end of the shaft. Again, features in the end of the shaft such as undercuts, hooks, grooves or even holes may assist in such attachment Further, it is contemplated that the end cap and shaft, or central portion, may be attached by welding processes wherein one or both of the components may be heated, spun, vibrated, etc. to provide a melt bonding together. These welding processes may include, but are not limited to, hot plate welding, hot gas welding, vibration welding, ultrasonic welding, electromagnetic-induction welding, electron beam welding, laser welding, infrared welding, microwave welding, and radio-frequency welding. One particular type of welding amenable to the present invention due the round shape of the shaft, or central portion, and end caps is spin welding wherein one of the components, shaft or end cap, may be rotated at a high speed against the other component until one of the surfaces in contact melts, whereupon cooling, the surfaces adhere.

Finally, it is contemplated that any combination of the aforementioned attachment methods may be used to attach the end caps to the shaft or central portion.

The present invention has been set forth in reference to specific exemplary embodiments, but it should be understood by those skilled in the art that such exemplary embodiments are by way of illustration only. Modifications and variations will therefore be apparent and may be resorted to without departing from the spirit and equivalent scope of this invention. Accordingly, such modifications and equivalents should be considered to be within the purview of the scope of the invention as set forth in the appended claims.

What is claimed is:

1. An animal chew comprising an elongated central portion of a first material and a pair of end caps and a shaft of a second material, wherein said central portion comprises a hollow elastomeric bladder which overlies but is spaced from said shaft to define a gap comprising the volume of space extending between said shaft and said bladder, wherein said shaft includes ends which connects said endcaps and wherein said gap between said shaft and said bladder is hollow and devoid of any material layer;

wherein said bladder includes a longitudinal axis and an inner surface and said shaft includes a longitudinal axis and an outer surface and the inner surface of said bladder along said longitudinal axis is concave relative to said outer surface of said shaft wherein said elongated central portion has a length wherein said length is compressed by said end caps when said end caps are connected to said shaft and wherein said end caps protect said ends of said shaft from chewing.

2. The animal chew of claim 1 wherein said inner surface of said bladder is non-uniformly spaced from the outer surface of said shaft along said longitudinal axis.

3. The animal chew of claim 1 wherein said central portion comprises an outer fibrous layer, a backing layer for the outer fibrous layer and said bladder.

4. The animal chew of claim 3 wherein said backing layer adheres said outer fibrous layer to said bladder.

5. The animal chew of claim 3 wherein said fibrous layer is felt.

6. The animal chew of claim 3 wherein said backing layer comprises a thermoplastic material.

7. The animal chew of claim 1 wherein said elastomeric bladder comprises a thermoplastic elastomer or a thermoset elastomer.

8. The animal chew of claim 7 wherein said elastomer comprises a material that has an elongation of greater than 50% when stretched with a recovery of 50-100%.

9. The animal chew of claim 1 wherein at least one of said end caps includes a recess outboard of said shaft and said central portion includes ends and said ends of said central portion engage and fit within said recess and prevent access to said ends by an animal.

10. A method of producing an animal chew comprising the steps of:
   providing an elongated central portion comprising a hollow bladder, the elongated central portion having two ends;
   providing a pair of end caps, each of the end caps having a recessed portion for receiving either of the ends of said central portion;
   providing a shaft having ends to connect said end caps;
   attaching one of said pair of end caps to the shaft;
   placing said central portion over said shaft;
   attaching the other of said pair of end caps to said shaft wherein said ends of said central portion each engage a recessed portion of said end caps;
   wherein said bladder includes a longitudinal axis and an inner surface and said shaft includes a longitudinal axis and an outer surface and the inner surface of said bladder along said longitudinal axis is concave relative to said outer surface of said shaft and said inner surface of said bladder is separated by a first distance from said outer surface of said shaft said first distance being devoid of any material layer; and
   wherein said elongated central portion has a length wherein said length is compressed by said end caps when said end caps are attached to said shaft and said inner surface of said bladder is separated from said outer surface of said shaft by a second distance, wherein said second distance is greater than said first distance wherein said end caps protects said ends of said shaft from chewing.

11. The method of claim 10 wherein said shaft and said pair of end caps are mechanically attached.

12. The method of claim 11 wherein one or more of said of end caps may be threaded on to the shaft by providing a molded external thread on one or both ends of the shaft and a complementary internal thread one or both of the end caps.

13. The method of claim 10 wherein said shaft and said pair of end caps are attached by thermoplastic welding.

14. The method of claim 13 wherein said shaft and said pair of end caps are attached by one of hot plate welding, hot gas welding, vibration welding, ultrasonic welding, electromagnetic-induction welding, electron beam welding, laser welding, infrared welding, microwave welding, and radio-frequency welding.

15. The method of claim 10 wherein said shaft and said pair of end caps are attached by spin welding of the end caps to the shaft.

16. The method of claim 10 wherein one of said shaft is integrally molded with one of said end caps.

17. The method of claim 10 wherein said central portion further comprises an outer fibrous layer and a backing layer for the outer fibrous layer overlying said bladder.

* * * * *